United States Patent

Short et al.

[11] Patent Number: 5,909,705
[45] Date of Patent: Jun. 8, 1999

[54] VACUUM SEAL FOR SLIDE GUIDING

[75] Inventors: Michael L. Short, Wapakoneta; John B. Bornhorst, New Bremen; Eward A. Daniel, Ft. Loramie; Dale A. Homan, Maria Stein, all of Ohio

[73] Assignee: The Minster Machine Company, Minster, Ohio

[21] Appl. No.: 08/886,931

[22] Filed: Jul. 2, 1997

Related U.S. Application Data

[60] Provisional application No. 60/021,301, Jul. 8, 1996.
[51] Int. Cl.⁶ .................................................. B30B 15/04
[52] U.S. Cl. ............................ 100/214; 72/456; 384/39
[58] Field of Search ........................... 100/214, 299; 72/456; 384/13, 39, 40

[56] References Cited

U.S. PATENT DOCUMENTS

5,775,212  7/1998  Takao ........................................ 100/214

*Primary Examiner*—Stephen F. Gerrity
*Attorney, Agent, or Firm*—Randall J. Knuth

[57] ABSTRACT

A mechanism for guiding and controlling the clearance of slides of single or multiple slide mechanical presses. A novel gib mount assembly with at least one substantially flat bearing surface is utilized adjacent a portion of a slide to control clearance and undesired movement of the slide while sealing press lubrication oil from the area of the press where products are produced. Between the bearing surface of the gib mount and slide is created a squeeze seal oil film region to assist in controlling the clearance therebetween. One or more vacuum pressure regions are created about the boundaries of the oil film region to suction and capture any oil escaping from the oil film region thereby preventing oil contact with the stamped parts or products.

6 Claims, 6 Drawing Sheets

VACUUM SEAL FOR SLIDE GUIDING

This application claims the benefit under 35 USC 119(e) of provisional application No. 60/021,301 filed Jul. 8, 1996.

BACKGROUND OF THE INVENTION

1. Field of the Invention

The present invention relates to a mechanism for guiding slides of single or multi-slide mechanical presses.

2. Description of the Related Art

A gib is a mechanism in stamping or drawing press to adjust a reciprocating slide in a direction substantially normal to its reciprocating movement. Prior presses have had gibs that utilized wear plates along the outside edges of the slide and other press portions to control the clearances between the slide and press frame, in single slide presses and between one slide and another in a multi-slide press. These gibs have been used to adjust the running clearance of the slide.

Prior gibs have contained elastomeric seals to seal between the gib mounting surface and slide to prevent lubrication from passing from the gib, down the slide, and on to the parts being stamped on the press. Other ways of preventing oil from contacting product included sheet metal gutters and the like.

Known problems with elastomeric seals are that at times they do not seal properly and leak. Actually, for proper operation of these types of seals, normally a small amount of lubrication, (one or two drops) must pass by the seal to thereby cause the seal to fully seal against further leakage. In some production environments, such as food beverage containers, i.e., soft drink cans, beer cans, and like, even these one or two drops of lubrication contacting the formed cans is unacceptable. Leakages of lubrication fluid necessary for proper elastomeric seal operation have caused scraping of entire production runs of such beverage cans with an associated large cost.

Maintenance requirements on elastomeric or O-ring seals on these gibs is necessary since the seals have rubber or flexible wiper portions that mechanically wear over time. This mechanical wear causes the seals to eventually fail and leak. Removal and replacement of these seals necessitate the press to be placed off-line and disassembled to obtain service access to the gib mount assembly and elastomeric seal seat.

Depending on the number of slides a press has and its particular type of guiding, i.e., four point, six point, eight point, and others, the press may have varied numbers of these gib assemblies. The more gib assemblies with elastomeric seals, the higher the likelihood of a lubrication leak and the more need of service.

Other problems with gibs and associated seals is use of O-rings as seals. These seals required circular or annular mounts to seal i.e., locations without sharp corners. This necessitated that the areas sealed against need to be cylindrical shaped, rod shaped, or at least some shape with a curved or circular cross-section. These types of O-ring seals could not seal at interior or exterior corners since the seal would have to be slit and attached to another seal at the discontinuous point of the corner.

What is needed in the art is a gib mechanism for a press that seals against lubricant leakage without using elastomeric seals that eventually leak.

SUMMARY OF THE INVENTION

According to the present invention, a mechanism is disclosed for guiding and controlling the clearance of slides of single or multiple slide mechanical presses.

A gib mount with at least one substantially flat bearing surface is utilized adjacent a portion of a slide to control clearance and undesired movement of the slide while sealing press lubrication oil from the area of the press where products are produced. Between the bearing surface of the gib mount and slide is created a squeeze seal oil film region to assist in controlling the clearance therebetween. One or more vacuum pressure regions are created about the boundaries of the oil film region to suction and capture any oil escaping from the oil film region, thereby preventing oil contact with the stamped parts or products.

An advantage of the present invention is that the new gib assembly utilizes vacuum pressure to capture and contain lubrication oil thereby preventing oil contact with stamped parts.

Another advantage of the present invention is it permits the elimination of previous elastomeric seals used for gib assemblies. This elimination of elastomeric seals lower press production costs and assembly time.

A further advantage of the invention it that the new gib assembly has no portions that wear. Mechanical contact between the slide and gib assembly is prevented by the created oil film region, thereby creating an assembly that has a virtually no wear and a corresponding long operational life time. Since there are no portions that wear, maintenance requirements of the gib assemblies are also vastly reduced.

Another advantage of the present invention is that the new gib assembly may be used on single or multiple slide presses. Since most types of presses utilizing gib assemblies have more that one such assembly, the benefits of the present invention are multiplied by the number of gib assemblies replaced.

Yet another advantage of the present invention is that the new gib assembly is geometry independent, in that it seals about or around corners. No longer is the opposite sealing surface required to be circular or curved. No cutting and splicing of sealing members are needed to go about a corner or edge.

A further advantage of the present invention is that the surface finish of the sealing portions of the gib assembly and slide do not need to have an extreme surface smoothness as previously required. The system permits sealing of surfaces of up to 64 microfinish, thereby reducing polishing and associated finishing costs.

Another advantage of the system is that, in case the press happens to burn a bearing or touch down, there is no requirement to disassemble the slides to replace ruined elastomeric gib seals.

Yet another advantage of the present invention is that there is no limit to the size in length and width of the oil film regions as long as the vacuum regions have sufficient capacity and volume to capture any leaking oil. Further, the oil film region does not have to be absolutely parallel for the system to operate. Additionally, different size clearances may be created or developed between the gib assembly and slide to change the operation of the system.

A further advantage of the present system is that the vacuum system will still operate during a loss of oil. In a condition of zero clearance between the gib mount and slide, the vacuum seal will still function. Prior seals will not operate with a zero clearance.

Another advantage of the present system that if the vacuum system ever ceases to operate or sufficient vacuum pressure, a press stop condition will be activated to stop the press from forming possibly oil contaminated pieces.

The invention, in one form thereof, comprises a gib assembly for a press having a slide. The assembly includes a gib mount attached to the press, the mount having a surface located opposite and substantially parallel to the slide, an oil film region on said surface that during operation has an oil film formed thereon between the surface and said slide, and a vacuum pressure region surrounding the oil film region on the surface that during operation is under vacuum pressure, whereby during operation, oil exiting from the oil film region is captured in the vacuum pressure region.

The invention, in another form thereof, comprises a press including a frame with a slide mounted within the frame for reciprocation relative thereto and a drive unit for reciprocating the slide. A gib mount is attached to the frame opposite the slide, the mount including an oil film region and a vacuum region. A source of pressurized oil is included for applying pressurized oil to the oil film region between the gib mount and the slide whereby an oil film is created between the gib mount and slide. A source of vacuum pressure is used for applying vacuum pressure to the vacuum region whereby oil leaking from the oil film region is captured by the vacuum region.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates preferred embodiments of the invention, and such exemplification is not to be construed as limiting the scope of the invention in any manner.

DETAILED DESCRIPTION OF THE INVENTION

Figure 1:
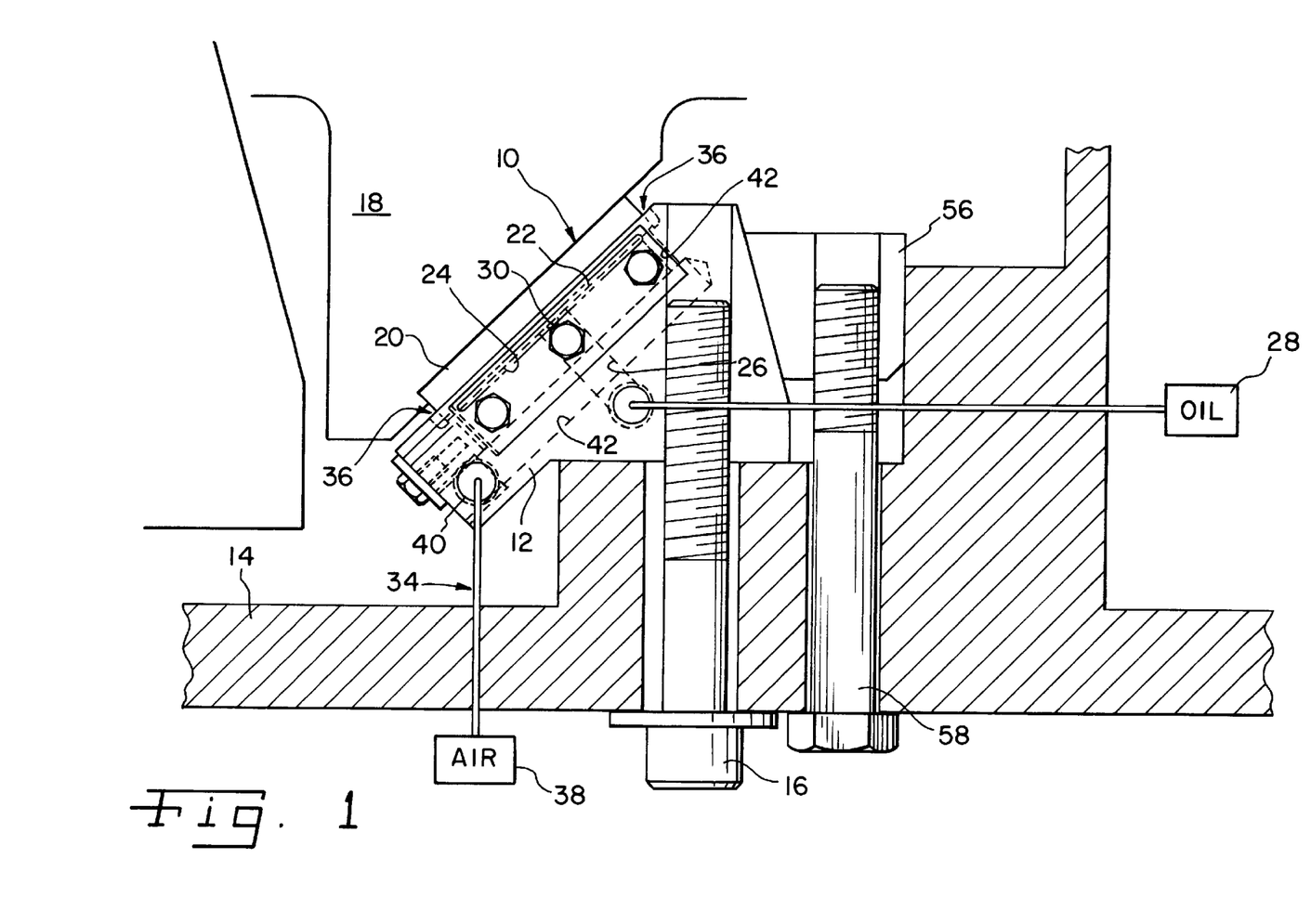
FIG. 1 is a sectional view of one embodiment of the vacuum seal assembly of the present invention.
Figure 2:
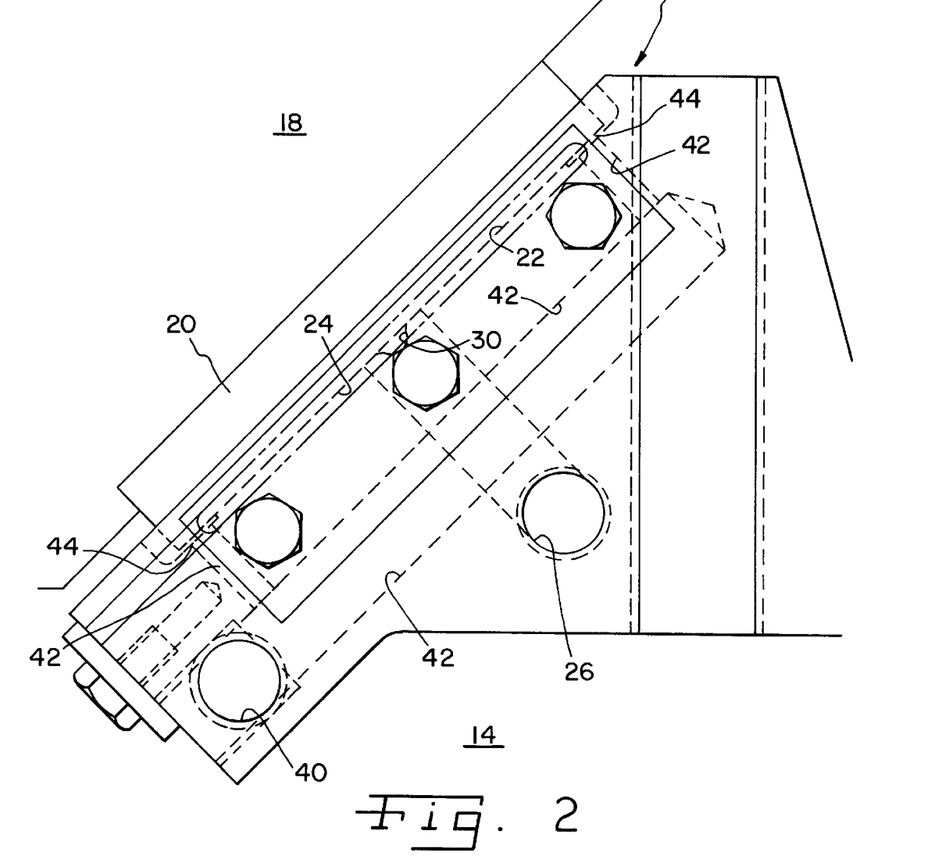
FIG. 2 is a enlarged sectional view of vacuum seal assembly shown in FIG. 1.

Referring now to the drawings and particularly to FIGS. 1 and 2, there is shown the gib assembly 10 of the present invention. Assembly 10 includes a gib mount 12 connected to portion of a mechanical press 14 by a connection means such as a plurality of bolts 16. A portion of press slide 18 is shown in FIGS. 1 and 2 having an optional wear plate 20. Wear plate 20 has been used in testing system 10 and is not always necessary for proper operation. Wear plate 20 may be considered a part of slide 18. Portion 14 may be a part of a press such as a press frame, crown, bed or even a secondary press slide.

Figure 3:
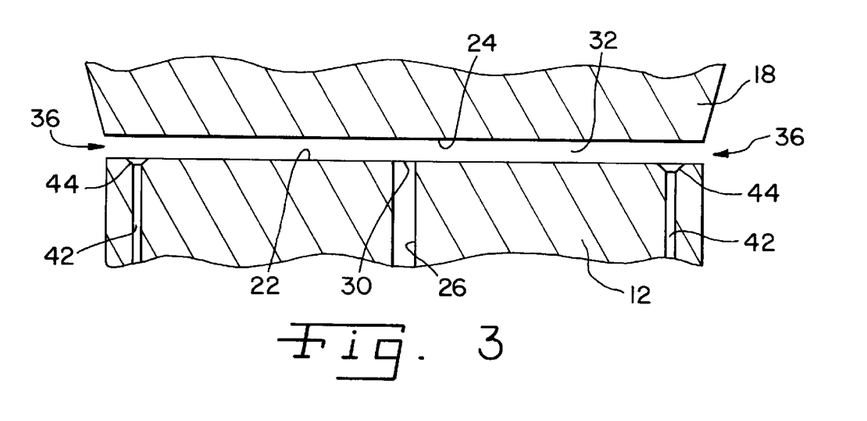
FIG. 3 is an exaggerated diagrammatic view of portions of one embodiment of the present invention.

In accordance with the present invention, gib mount 12 includes a surface 22 that is opposite and adjacent slide 18 and its corresponding surface 24 more clearly shown in FIG. 3. Gib mount surface 12 is substantially flat. Through gib mount 12 is an oil passageway 26 connected to a source of pressurized oil 28. Oil passageway 26 includes at least one port 30 that supplies oil to an oil film region 32 shown in exaggerated size between surfaces 22 and 24 in FIG. 3. During operation, oil source 28 supplies oil under pressure through oil passageways 26 causing a squeeze oil film to be developed in the clearance space between surfaces 22 and 24. This squeeze oil film created is the location of the identified oil film region 32.

The typical clearance between surfaces 22 and 24, which is also the thickness of oil film region 32, is approximately 0.0015 to 0.006 inches during normal press operation. Alternate clearance sizes may be utilized but may have an effect on the squeeze oil film produced, such as lowering its support capacity. Additionally, the type and quality of lubrication oil supplied to oil film region has an effect on the optimum clearance size. The preferred clearance space of 0.0015 to 0.006 inches is utilized with standard 1000 S.S.U. press lubrication oil. Use of other types and qualities of lubrication oil would change the typical clearance range.

Oil pressure delivered by oil supply is approximately between 30 pounds per square inch (PSI) and 150 pounds per square inch (PSI). The pressure of oil necessary to form the squeeze oil film in oil film region 32 will vary depending on the clearance between surfaces 22 and 24, the type of oil utilized, the area of surfaces 22 and 24, and the relative velocities between surfaces 22 and 24.

No substantial polishing or finishing of surfaces 22 and 24 are necessary as compared to the prior art to achieve an adequate seal between gib assembly 10 and slide 18. This provides a tremendous savings during manufacturing and maintenance.

The invention also includes vacuum system porting 34 to create a vacuum pressure region 36 (FIG. 3) about oil film region 32 to contain oil located therein and prevent any such oil from escaping to another area.

Vacuum system porting 34 includes a means of creating a vacuum or at least an area of pressure lower than that of the ambient air so that leaking oil will be drawn into the vacuum system porting 34 as opposed to flowing or dripping to other areas of the press.

Vacuum pressure region 36 is created in gib assembly 10 by action of a source of pressurized air 38 forcing pressurized air through a pressurized passageway section 40. Passageways 42 communicate the vacuum pressure region from passageway section 40 through vacuum ports 44 in gib mount 12 to the clearance between surfaces 22 and 24. Several means of vacuum mechanisms for creating a reduced pressure area may be used equivalently to create the vacuum pressure in passageway 40. In one embodiment of the invention, pressurized passageway section 40 comprises a venturi tube. Another way to create a reduced pressure area comprises use of an vacuum pump. The means for generating the vacuum or reduced pressure area may be monolithically formed in gib mount 12 as shown in FIGS. 1 and 2, or may be mounted elsewhere on or off the press structure.

As shown in the drawings, vacuum ports 44 on surface 22 may be connected together by passageways or channels 46 to capture and drain oil escaping from oil film region 32 and draw such oil and ambient atmosphere into ports 44, vacuum system porting 34 and back to an oil sump of the press (not shown). In this way, escaping oil is able to be reused. A vacuum pressure of approximately 10 PSI is developed about vacuum ports 44. Other vacuum pressures may be developed based the air pressure supplied through pressurized passageway section 40, and the amount of oil to be captured.

Gib assembly 10 may utilized different geometries and shapes of surface 22 to assist in creating and controlling oil film region 32 and vacuum pressure region 36. FIG. 3 shows the easiest geometry to manufacture, that of surface 22 being substantially flat the entire length of gib mount 12. Thus the clearance between surfaces 22 and 24 is nearly constant for areas inboard from vacuum ports 44 toward oil ports 30 and outboard from vacuum ports 44 to the edge of surface 22 and out into the ambient atmosphere.

Figure 7:
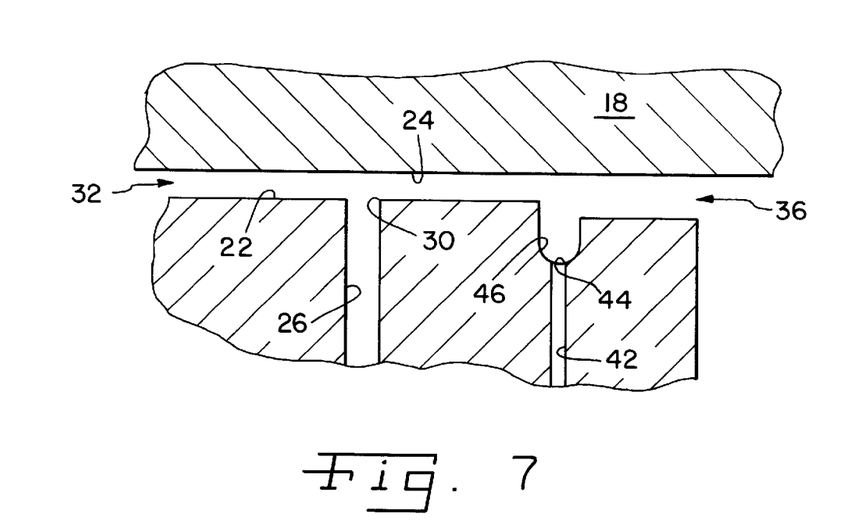
FIG. 7 is an exaggerated sectional view of another embodiment of the invention showing use with an enlarged clearance vacuum area.
Figure 8:
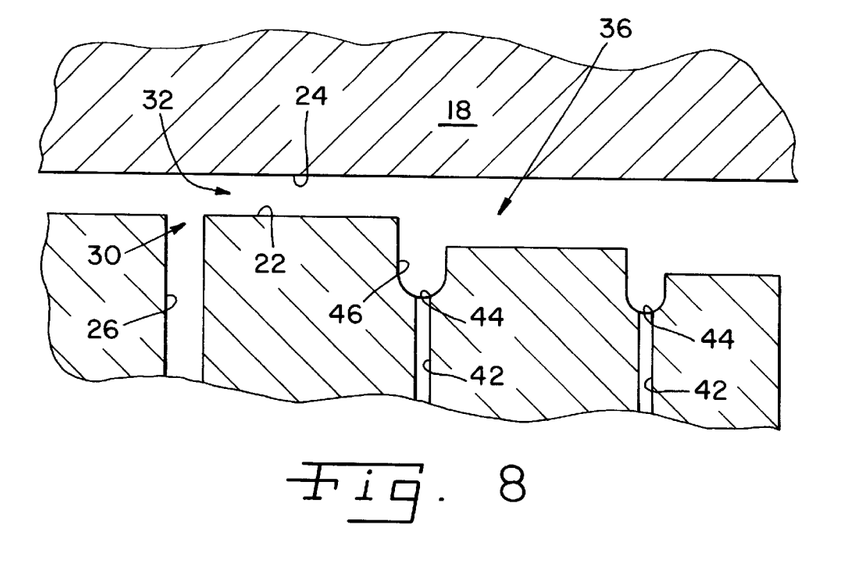
FIG. 8 is an exaggerated sectional view of another embodiment of the invention utilizing two separate vacuum systems.
Figure 9:
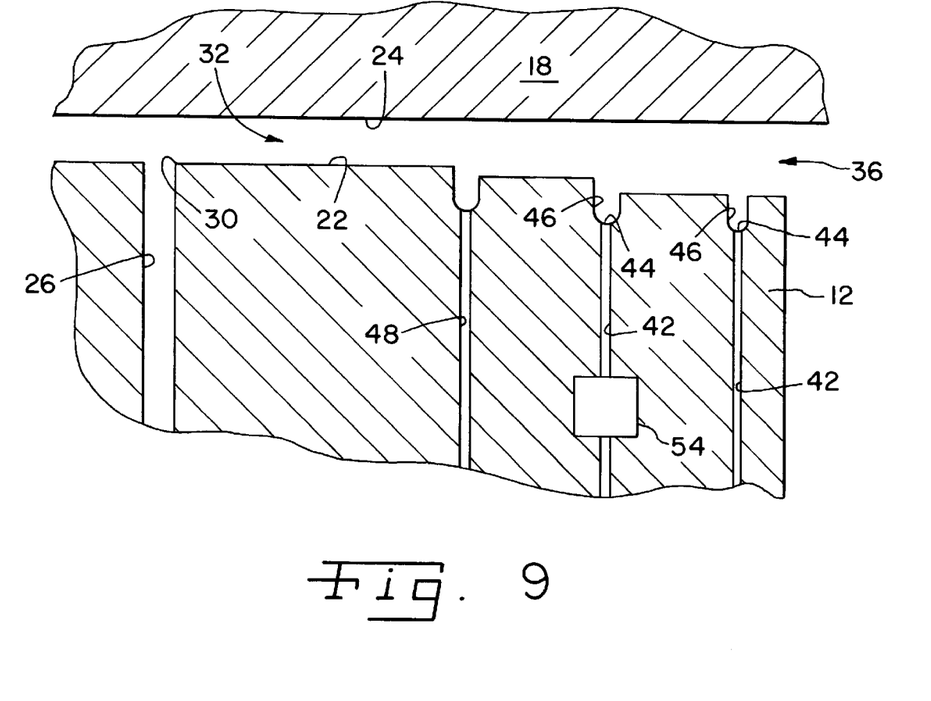
FIG. 9 is an exaggerated sectional view of other embodiment showing use of an oil removal system.

As shown in FIGS. 7 though 9, alternate spacing and clearances between portions of surfaces 22 and 24 may be utilized. FIG. 7 shows an embodiment of the invention where the clearance between surfaces 22 and 24 outboard from vacuum ports 44 are larger. Depending on the amount of vacuum necessary and flow rates needed for capturing escaping oil for the particular press and its normal running speed, this outboard area may be sized larger or smaller or have greater or lesser clearance than the area of oil film region 32.

FIG. 8 shows another embodiment of gib assembly 10 utilizing two vacuum ports 44 attached to two separate vacuum generating means (not shown). In some cases it may be necessary to use two independent vacuum systems 34. Although only one may be necessary, two such independent systems would prevent the failure of any one system 34. As shown, surface 22 may have different clearances between ports 44 and surface 24 depending upon the necessary flow characteristics needed to ensure capture of all oil escaping from oil film region 32.

FIG. 9 depicts another embodiment of the invention using an addition oil drain system 48. Oil drain system 48 includes an oil pump (not shown) for draining liquid oil away from the oil film region 32 of the invention. Depending on the relative rate of speed between gib assembly 10 and slide 18, additional oil input flow through ports 30 may be necessary to cool the system and maintain the oil squeeze film generated. The function of pulling liquid oil from oil film region 32 would tend to prevent overloading of the vacuum system 34 with a excess amount of oil.

Figure 10:
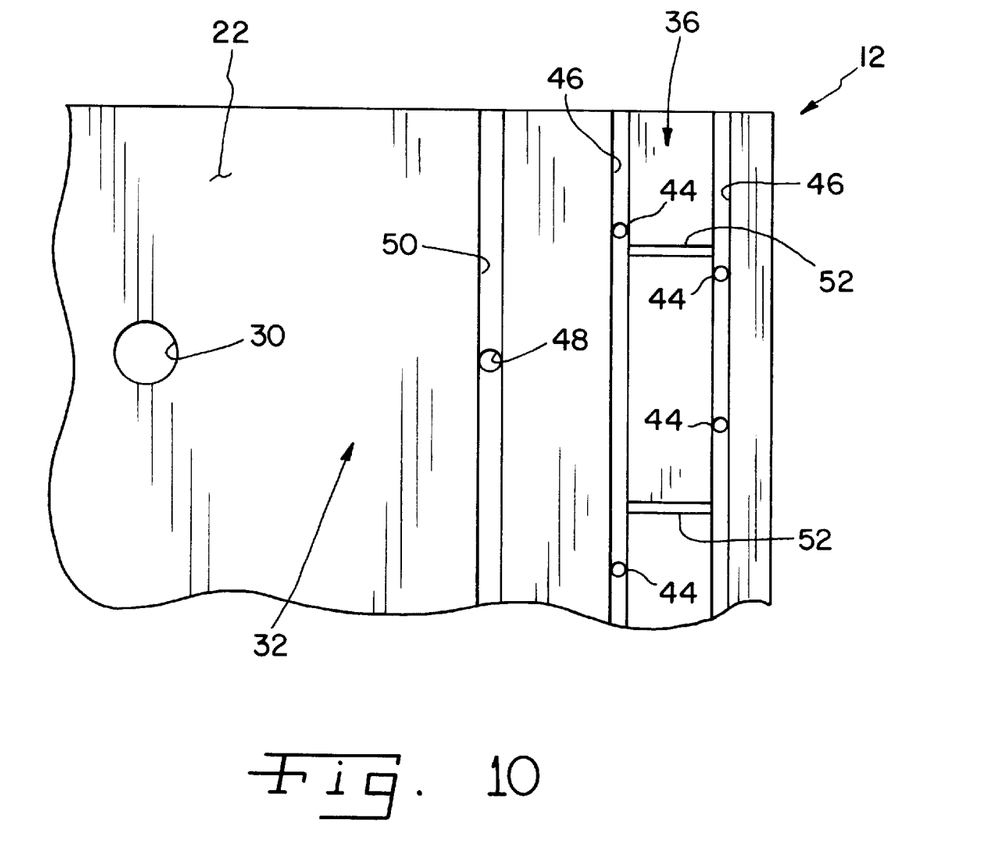
FIG. 10 is a plan view of the sealing system sealing surface of the embodiment shown in FIG. 9. This embodiment includes cross-linked vacuum channels.

For increased oil flow from oil film region 32 an oil pickup groove 50 (FIG. 10) may be associated with oil draining system 48 along surface 22 to assist in oil flow. To increase or control the vacuum pressure created, vacuum channels 46 may be interconnected by connection channels 52 (FIG. 10). Another feature showing in FIG. 9, but adaptable to all of the other embodiments, is that of a vacuum pressure sensor 54. This sensor 54 will determine whether or not vacuum system 34 is operating. If system 34 is not operating for some reason, a stop signal will be generated and transmitted to the press controller to halt press operation.

Figure 4:
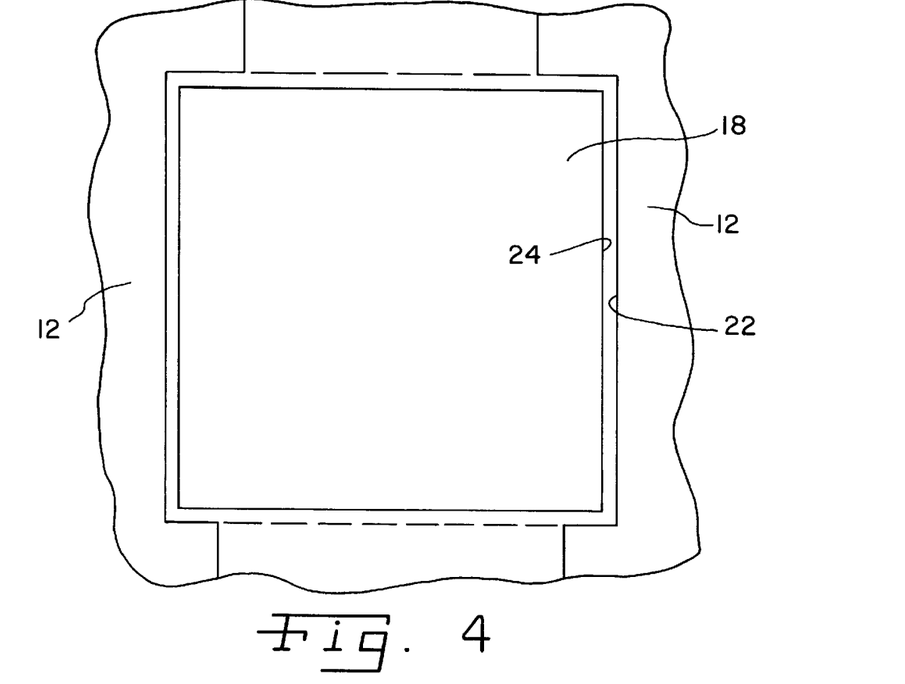
FIG. 4 is a schematic view of a portion of another embodiment of the present invention showing sealing around an angle.
Figure 5:
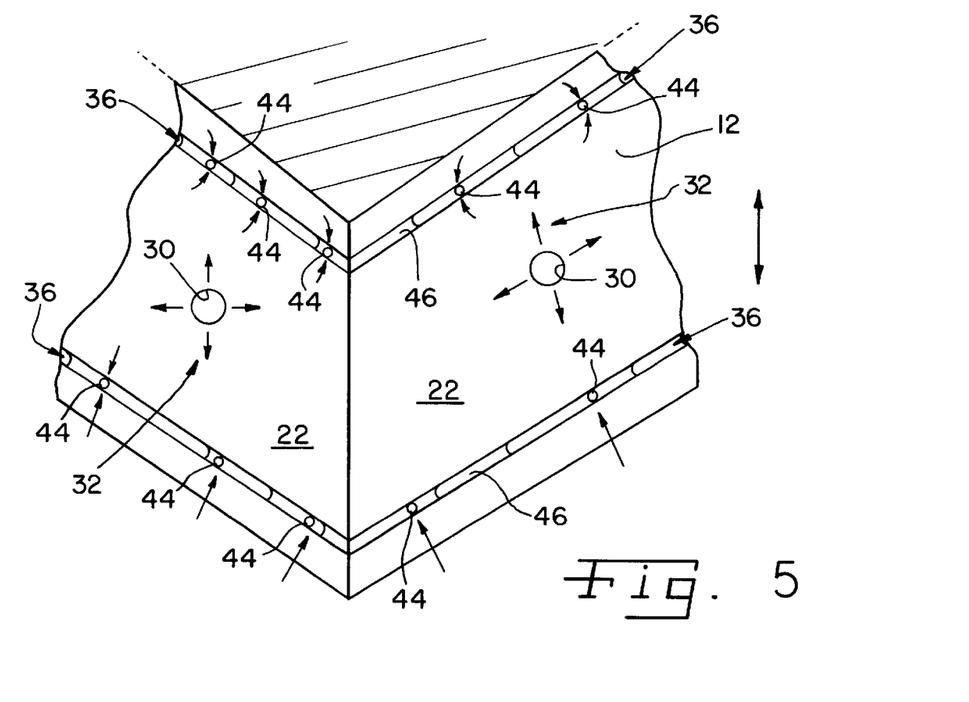
FIG. 5 is a exaggerated perspective view of another form of the invention shown applied to an interior edge of a sealing system.
Figure 6:
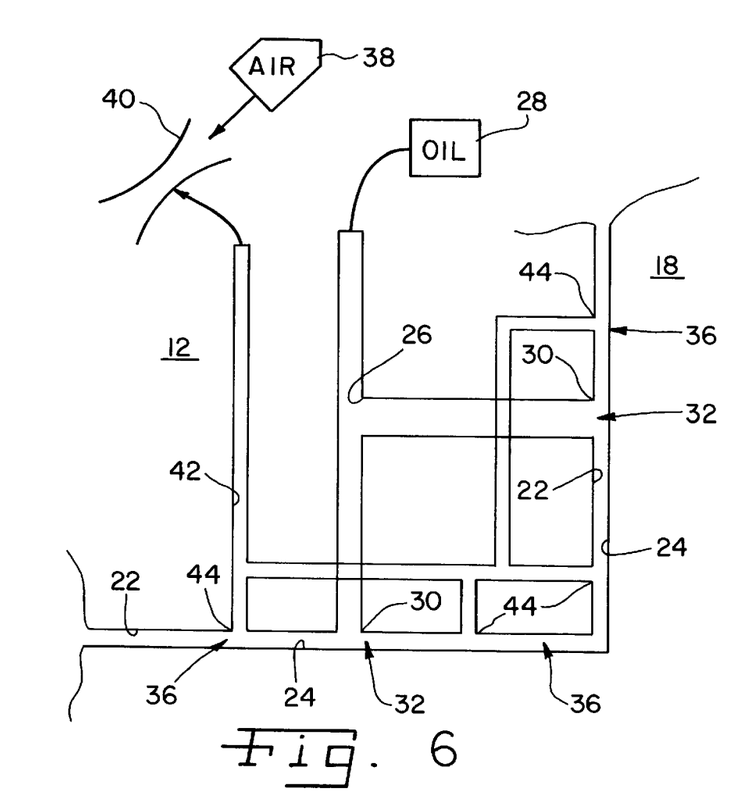
FIG. 6 is a sectional view of FIG. 5 showing one possible way of interconnecting the vacuum ports together and the oil ports together along with the associated venturi vacuum generator and pressurized oil supply.

Another embodiment of gib assembly 10 is shown in FIGS. 5 and 6 where gib assembly 10 includes two surfaces 22 that will seal via an oil film region 32 with an opposing slide 18. These drawings depict the possibility of using the oil film region and vacuum pressure region about an corner or edge or discontinuous point on gib mount 12. FIG. 4 depicts two gib assemblies 10 sealing on all four sides of slide 18.

Thus gib assembly 10 can seal in more than one direction at a time. Additionally, the previous limitation in the art of gib sealing, i.e., that of the slide bearing surface needing to be round or circular, is eliminated. Potentially fewer gib assemblies 10 would need to be utilized.

FIG. 5 depicts the sealing system of gib assembly 10 operating about an exterior edge of gib mount 12. Alternatively, the sealing could take place on an interior edge or angle with appropriate pressure control.

Adjustment of gib assembly 10, control of the clearances between surfaces 22 and 24, and control of the vacuum pressure region may be made by an gib adjustment member 56 as shown in FIG. 1. Adjustment member 56 is wedge shaped and connected by a bolt 58 to a portion 14 of the press. By selectively loosening and tightening bolts 16 and 58, gib mount 12 may be moved relative to press portion 14. A feature of the gib adjustment shown is that adjustment is conducted outside of portion 14, thereby no disassembly of portion 14 is required.

During press operation, oil supply 28 supplies pressurized oil through gib mount 12 and creates a squeeze oil film in and at oil film region 32 between gib mount 12 and slide 18, relative to respective surfaces 22 and 24. Pressurized air is communicated from air source 38 through vacuum system porting 34 and pressurized passageway 40 creating a vacuum or reduced pressure region, this region being communicated to areas between gib mount 12 and slide 18 and surrounding oil film region 32.

Vacuum pressure region 36 causes both ambient atmosphere and any lubrication oil escaping oil film region 36 to drawn away from gib mount 12 through vacuum channels 46, ports 44, and through vacuum passageways 42 to be collected in a press oil sump area (not shown). In this area, the captured oil may be filtered and resupplied to oil source 28.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A press comprising:

a frame;

a slide mounted within said frame for reciprocation relative thereto;

a drive unit for reciprocating said slide;

a gib mount attached to said frame opposite said slide, said mount including an oil film region and a vacuum region;

a source of pressurized oil applying pressurized oil to said oil film region between said gib mount and said slide whereby an oil film is created between said gib mount and said slide; and a source of vacuum pressure applying vacuum pressure to said vacuum region whereby oil leaking from said oil film region is captured by said vacuum region.

2. The press of claim 1 in which said mount is attached to a second slide of said press.

3. The press of claim 1 utilized with a press having multiple point guiding.

4. The press of claim 1 in which said gib mount is attached to said press by means of an adjustment mechanism that permits changing the clearance between said slide and said gib mount from either outside said press or without disassembly of a second slide.

5. The press of claim 1 in which the clearance between said gib mount and said slide is approximately within the range of 0.0015 to 0.006 inches.

6. The press of claim 1 in which the clearance between said gib mount and said slide is approximately within the range of 0.003 to 0.011 inches.

* * * * *